(12) United States Patent
Takemoto et al.

(10) Patent No.: US 10,764,505 B2
(45) Date of Patent: Sep. 1, 2020

(54) PROJECTION IMAGE PICKUP DEVICE AND PROJECTION IMAGE PICKUP METHOD

(71) Applicant: PANASONIC INTELLECTUAL PROPERTY MANAGEMENT CO., LTD., Osaka (JP)

(72) Inventors: Masato Takemoto, Osaka (JP); Shinzo Koyama, Osaka (JP); Shigeru Saitou, Kyoto (JP); Motonori Ishii, Osaka (JP); Hiroshi Koshida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 26 days.

(21) Appl. No.: 16/323,434

(22) PCT Filed: Aug. 7, 2017

(86) PCT No.: PCT/JP2017/028518
§ 371 (c)(1),
(2) Date: Feb. 5, 2019

(87) PCT Pub. No.: WO2018/030318
PCT Pub. Date: Feb. 15, 2018

(65) Prior Publication Data
US 2020/0195825 A1 Jun. 18, 2020

(30) Foreign Application Priority Data

Aug. 10, 2016 (JP) .................... 2016-158041

(51) Int. Cl.
*H04N 5/235* (2006.01)
*H04N 5/232* (2006.01)
(Continued)

(52) U.S. Cl.
CPC ............ *H04N 5/2352* (2013.01); *G01S 17/00* (2013.01); *G01S 17/003* (2013.01);
(Continued)

(58) Field of Classification Search
CPC .. H04N 5/2352; H04N 5/23232; H04N 5/235; H04N 5/2256; H04N 5/2351; G01S 17/00; G01S 17/003; G01S 17/86
See application file for complete search history.

(56) References Cited

U.S. PATENT DOCUMENTS

2005/0162638 A1 7/2005 Suzuki et al.
2005/0232478 A1* 10/2005 Onishi ................ G06T 7/0004
382/149

(Continued)

FOREIGN PATENT DOCUMENTS

| EP | 2 634 595 A1 | 9/2013 |
| JP | 5167755 B2 | 3/2013 |
| WO | 2015/036592 A1 | 3/2015 |

OTHER PUBLICATIONS

International Search Report and Written Opinion dated Oct. 3, 2017 in International Application No. PCT/JP2017/028518; with partial English translation.

(Continued)

*Primary Examiner* — Abdelaaziz Tissire
*Assistant Examiner* — John H Morehead, III
(74) *Attorney, Agent, or Firm* — McDermott Will & Emery LLP

(57) ABSTRACT

A projection image pickup device includes a pulsed-light emitter, an optical sensor, a reference timing generator that generates a signal indicating an operation reference timing, a controller, and a signal processor. The signal processor sets a differential signal between an output signal from the optical sensor in the second exposure period and an output (Continued)

signal from the optical sensor in the first exposure period as a first differential signal, sets a differential signal between an output signal from the optical sensor in the third exposure period and the output signal from the optical sensor in the first exposure period as a second differential signal, and outputs the sum total of at least two differential signals including the first differential signal and the second differential signal.

17 Claims, 18 Drawing Sheets

(51) Int. Cl.
*H04N 5/225* (2006.01)
*G01S 17/00* (2020.01)

(52) U.S. Cl.
CPC ........... *H04N 5/2256* (2013.01); *H04N 5/235* (2013.01); *H04N 5/2351* (2013.01); *H04N 5/23232* (2013.01)

(56) References Cited

U.S. PATENT DOCUMENTS

2016/0119594 A1    4/2016  Asano et al.
2016/0173802 A1*   6/2016  Matsuo ................ H04N 5/3765
                                              348/322
2018/0329063 A1*  11/2018  Takemoto ............... G01S 17/86

OTHER PUBLICATIONS

Supplementary European Search Report dated Jun. 17, 2019, issued in European Patent Application No. 17839389.8.

* cited by examiner

PROJECTION IMAGE PICKUP DEVICE AND PROJECTION IMAGE PICKUP METHOD

CROSS-REFERENCE OF RELATED APPLICATIONS

This application is the U.S. National Phase under 35 U.S.C. § 371 of International Patent Application No. PCT/JP2017/028518, filed on Aug. 7, 2017, which in turn claims the benefit of Japanese Application No. 2016-158041, filed on Aug. 10, 2016, the entire disclosures of which applications are incorporated by reference herein.

TECHNICAL FIELD

The present disclosure relates to a projection image pickup device and a projection image pickup method.

BACKGROUND ART

Conventionally, a projection image pickup device has been proposed that can stably pick up images, with the influence of ambient light such as sunlight or streetlight reduced, by picking up images in synchronization with an own light emitting device (Patent Literature (PTL) 1).

PTL 1 proposes a technique for obtaining a noise-reduced measurement signal by finding a weighted average of signals obtained from an image pickup device in synchronization with pulsed light from a projection device.

CITATION LIST

Patent Literature

PTL 1: Japanese Patent No. 5167755

SUMMARY OF THE INVENTION

Technical Problem

However, the image pickup device according to PTL 1 has a problem in that if powerful ambient light enters, signals of the image pickup device will saturate, disabling proper image pickup.

An object of the present disclosure is to provide a projection image pickup device and projection image pickup method capable of reducing the influence of powerful ambient light.

Solution to Problem

A projection image pickup device according to an aspect of the present disclosure includes: a pulsed-light emitter; an optical sensor; a reference timing generator that generates a signal indicating an operation reference timing; a controller; and a signal processor. During a first exposure period in a frame, the controller performs exposure control over the optical sensor in synchronization with the operation reference timing and causes the pulsed-light emitter to turn off, during a second exposure period in the frame, the controller performs exposure control over the optical sensor in synchronization with the operation reference timing and causes the pulsed-light emitter to emit light in synchronization with the operation reference timing, and during a third exposure period in the frame, the controller performs exposure control over the optical sensor in synchronization with a timing obtained by adding a predetermined delay time to the operation reference timing and causes the pulsed-light emitter to emit light in synchronization with the operation reference timing. The pulsed-light emitter emits light according to light emission control of the controller, and the optical sensor is exposed according to the exposure control of the controller and outputs an output signal indicating an amount of exposure to the signal processor. The signal processor sets a differential signal between an output signal from the optical sensor in the second exposure period and an output signal from the optical sensor in the first exposure period as a first differential signal, sets a differential signal between an output signal from the optical sensor in the third exposure period and the output signal from the optical sensor in the first exposure period as a second differential signal, and outputs a sum total of at least two differential signals including the first differential signal and the second differential signal.

A projection image pickup method according to an aspect of the present disclosure is a projection image pickup method for an apparatus that includes a controller, a pulsed-light emitter that emits light according to light emission control of the controller, an optical sensor that is exposed according to exposure control of the controller and generates an output signal indicating an amount of exposure, a reference timing generator that generates a signal indicating an operation reference timing, and a signal processor, the method includes: performing exposure control over the optical sensor in synchronization with the operation reference timing and causing the pulsed-light emitter to turn off, by the controller, during a first exposure period in a frame; performing exposure control over the optical sensor in synchronization with the operation reference timing and causing the pulsed-light emitter to emit light in synchronization with the operation reference timing, by the controller, during a second exposure period in the frame; performing exposure control over the optical sensor in synchronization with a timing obtained by adding a predetermined delay time to the operation reference timing and causing the pulsed-light emitter to emit light in synchronization with the operation reference timing, by the controller, during a third exposure period in the frame; calculating a differential signal between an output signal from the optical sensor in the second exposure period and an output signal from the optical sensor in the first exposure period as a first differential signal, by the signal processor; calculating a differential signal between an output signal from the optical sensor in the third exposure period and the output signal from the optical sensor in the first exposure period as a second differential signal, by the signal processor; and calculating a sum total of at least two differential signals including the first differential signal and the second differential signal, by the signal processor.

Advantageous Effect of Invention

The projection image pickup device and projection image pickup method according to the present disclosure can reduce the influence of powerful ambient light.

DESCRIPTION OF EXEMPLARY EMBODIMENT

A projection image pickup device according to an embodiment of the present disclosure will be described below with reference to the drawings.

However, the more detailed description than necessary may be omitted. For example, detailed description of well-known matters or redundant description of substantially identical configurations may be omitted. This is to avoid subsequent description becoming unnecessarily redundant and facilitate understanding of those skilled in the art. Note that the accompanying drawings and the following description are intended for those skilled in the art to fully understand the present disclosure, and are not intended to limit the subject matter of the claims.

Also, without departing from the spirit of the present disclosure, changes to the following embodiment will occur to those skilled in the art and various modifications resulting from these changes are also included in the present disclosure. Also, at least part of plural embodiments and/or configuration examples may be used in combination without departing from the spirit of the present disclosure.

Embodiment

Figure 1:
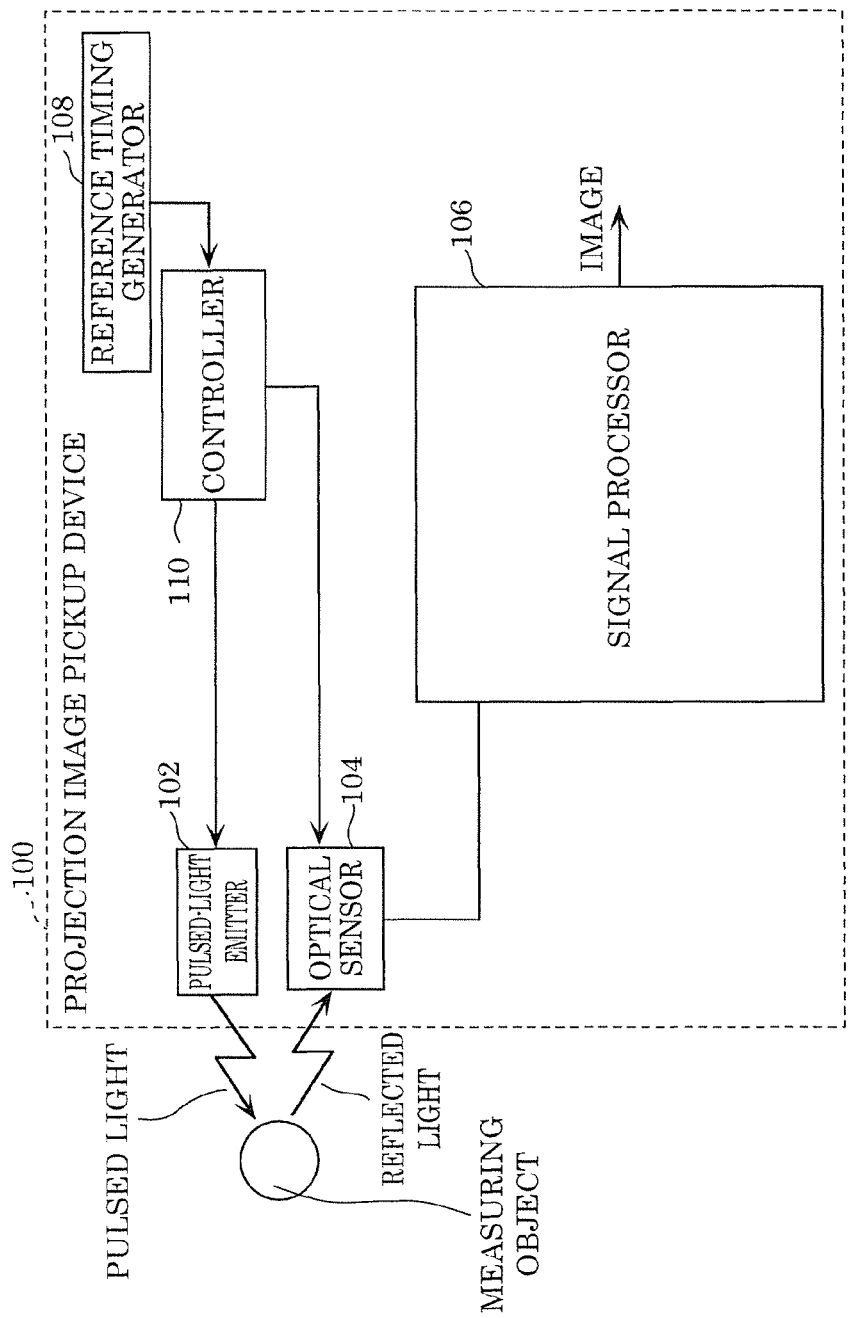
FIG. 1 is a block diagram showing a configuration example of a projection image pickup device according to an embodiment.

FIG. 1 is a block diagram showing a configuration example of projection image pickup device 100 according to the present embodiment. Projection image pickup device 100 includes pulsed-light emitter 102, optical sensor 104, signal processor 106, reference timing generator 108, and controller 110.

Pulsed-light emitter 102 emits pulsed light according to light emission control of controller 110.

Optical sensor 104 receives reflected light, i.e., light reflected off a measuring object, and converts the reflected light into an electric signal.

Signal processor 106 accumulates and calculates electric signals outputted from optical sensor 104.

Reference timing generator 108 generates a reference timing signal for use to determine exposure time and exposure timing of the pulsed light emitted from pulsed-light emitter 102 and received by optical sensor 104.

Controller 110 controls emission timing, emission duration, and output of pulsed light as well as controls exposure timing and exposure duration. Projection image pickup device 100 can implement plural drive modes.

Also, optical sensor 104 may be any of the following: a single pixel of an image sensor, a pixel column of an image sensor, a pixel row of an image sensor, any plural adjacent pixels of an image sensor (e.g., 9 pixels made up of 3 rows by 3 columns or plural pixels adjacent to one another along a diagonal line), or an entire image sensor.

When optical sensor 104 is made up of a single pixel of an image sensor, signal processor 106 may be installed in each pixel circuit, disposed outside a pixel area, or provided as an element (e.g., an ISP—Image Signal Processor—or a program on a computer) separate from the image sensor.

When optical sensor 104 is made up of a pixel column of an image sensor, signal processor 106 may be installed on each pixel column, disposed outside a pixel area, or provided as an element (e.g., an ISP or a program on a computer) separate from the image sensor.

When optical sensor 104 is made up of a pixel row of an image sensor, signal processor 106 may be installed on each pixel row, disposed outside a pixel area, or provided as an element (e.g., an ISP or a program on a computer) separate from the image sensor.

When optical sensor 104 is made up of any plural pixels of an image sensor, signal processor 106 may be disposed outside a pixel area or provided as an element (e.g., an ISP or a program on a computer) separate from the image sensor.

When optical sensor 104 is made up of an entire image sensor, signal processor 106 may be disposed outside a pixel area or provided as an element (e.g., an ISP or a program on a computer) separate from the image sensor.

Figure 2:
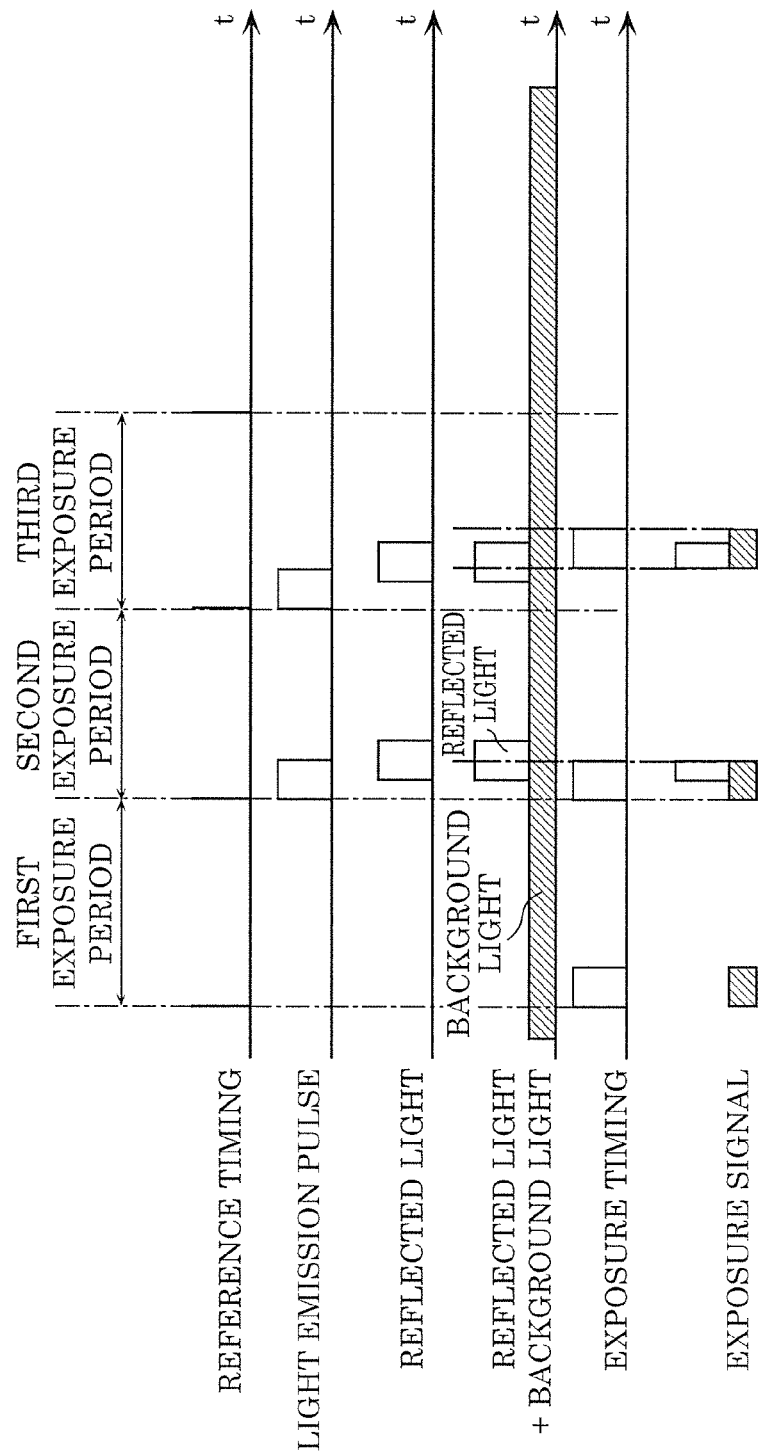
FIG. 2 is a timing chart showing a first drive mode of the projection image pickup device according to the embodiment.

FIG. 2 is a timing chart showing a first drive mode of projection image pickup device 100. In the first drive mode, optical sensor 104 is exposed to a background light component during a first exposure period and outputs a result to signal processor 106.

Then, during second exposure period, optical sensor 104 is exposed in synchronization with a light emission pulse of pulsed-light emitter 102 and outputs a result to signal processor 106. Consequently, of reflected light, the sum of a component overlapped with exposure timing in the second exposure period and a background light component is outputted to signal processor 106. By dividing exposure to reflected light of the light emission pulse into the second exposure period and third exposure period, exposure time per exposure is shortened, reducing the background light component for exposure and thereby making signals of optical sensor 104 hard to saturate.

Then, in the third exposure period, the optical sensor is exposed in synchronization with timing obtained by adding a predetermined delay time to the timing of the light emission pulse of pulsed-light emitter 102 and outputs a result to signal processor 106. Desirably, the predetermined delay is set equal to the duration of the exposure, but this is not restrictive. Consequently, of reflected light, the sum of a component overlapped with exposure timing in the third exposure period and a background light component is outputted to signal processor 106.

Then, signal processor 106 subtracts the signal obtained in the first exposure period from the signal obtained in the second exposure period and the signal obtained in the third exposure period, and obtains a first differential signal and a second differential signal, respectively. If the first differential signal and second differential signal are added together, only a reflected light component of the light emission pulse can be obtained.

Also, signal processor 106 may calculate an average value of the signal obtained in the second exposure period and the signal obtained in the third exposure period, subtract the signal obtained in the first exposure period from the average value, and thereby obtain the reflected light component of the light emission pulse.

Figure 3:
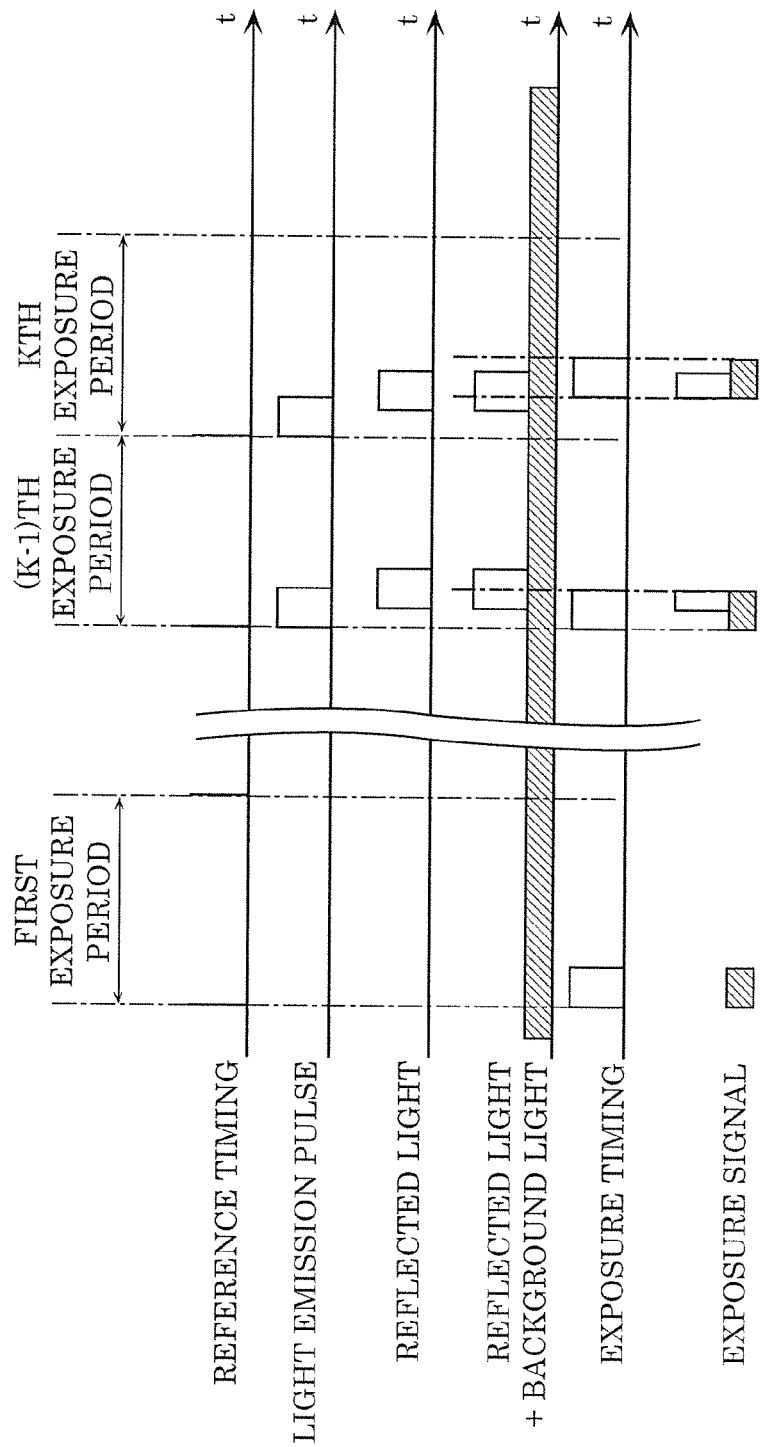
FIG. 3 is a timing chart showing a second drive mode of the projection image pickup device according to the embodiment.

FIG. 3 is a timing chart showing a second drive mode of projection image pickup device 100. From the first exposure period to the third exposure period, the second drive mode is the same as the first drive mode shown in FIG. 2.

In the second drive mode, when an object distance range is divided into (N−1) parts (N is an integer greater than or equal to 4), in the Kth exposure period (K is an integer between 3 and N, both inclusive), optical sensor 104 is exposed in synchronization with timing obtained by adding a predetermined delay time to the light emission timing of pulsed-light emitter 102 in the (K−1)th exposure period and outputs a result to signal processor 106.

Using a differential signal between an output signal from optical sensor 104 in the Kth exposure period and an output signal from optical sensor 104 in the first exposure period as the (K−1)th differential signal, signal processor 106 outputs a sum total of differential signals from the first differential signal to the (N−1)th differential signal as a result.

In so doing, of the first differential signal to the (N−1)th differential signal, the sum total of only the signals equal to or higher than a predetermined threshold may be outputted as a result. The predetermined threshold, for example, may be set to a value equal to shot noise of the background light in the first exposure period or may be set according to the distance range used for image pickup in each exposure period.

Also, emission intensity of pulsed-light emitter 102 in each exposure period may be varied according to the distance range used for image pickup in the exposure period. For example, in an exposure period corresponding to a short distance, if the emission intensity is reduced, saturation and flares of optical sensor 104 due to strong reflected light from an object in a short distance can be inhibited.

Also, sensitivity of optical sensor 104 in each exposure period may be varied according to the distance range used for image pickup in the exposure period. For example, in an exposure period corresponding to a short distance, if the sensor sensitivity is reduced, saturation and flares of optical sensor 104 resulting from image pickup of reflected light from an object in a short distance at high sensitivity can be inhibited.

Also, exposure time of optical sensor 104 in each exposure period may be varied according to the distance range used for image pickup in the exposure period. For example, in an exposure period corresponding to a short distance, if the exposure time is reduced, saturation and flares of optical sensor 104 due to strong reflected light from an object in a short distance can be inhibited.

Desirably, the predetermined delay is set equal to the duration of the exposure, but this is not restrictive. Also, the predetermined delay may vary with the exposure period. Such division into plural exposure periods makes it possible to reduce the influence of background light.

Although in FIG. 3, the first exposure period in which exposure is made only to the background light component occurs only at the head of a frame, exposure to the background light component alone may be made in the Mth exposure period rather than at the head of a frame. That is, a period in which exposure is made only to the background light component may be provided in any of the exposure periods.

Also, plural periods of exposure to the background light component alone may be provided. In particular, exposure is made only to the background light component preferably just before the Kth exposure period, i.e., the period in which optical sensor 104 is exposed in synchronization with timing obtained by adding a predetermined delay time to the light emission timing of pulsed-light emitter 102. This makes it possible to inhibit motion blur caused by a time lag between each exposure timing in the frame and exposure timing of the background light component.

Figure 4:
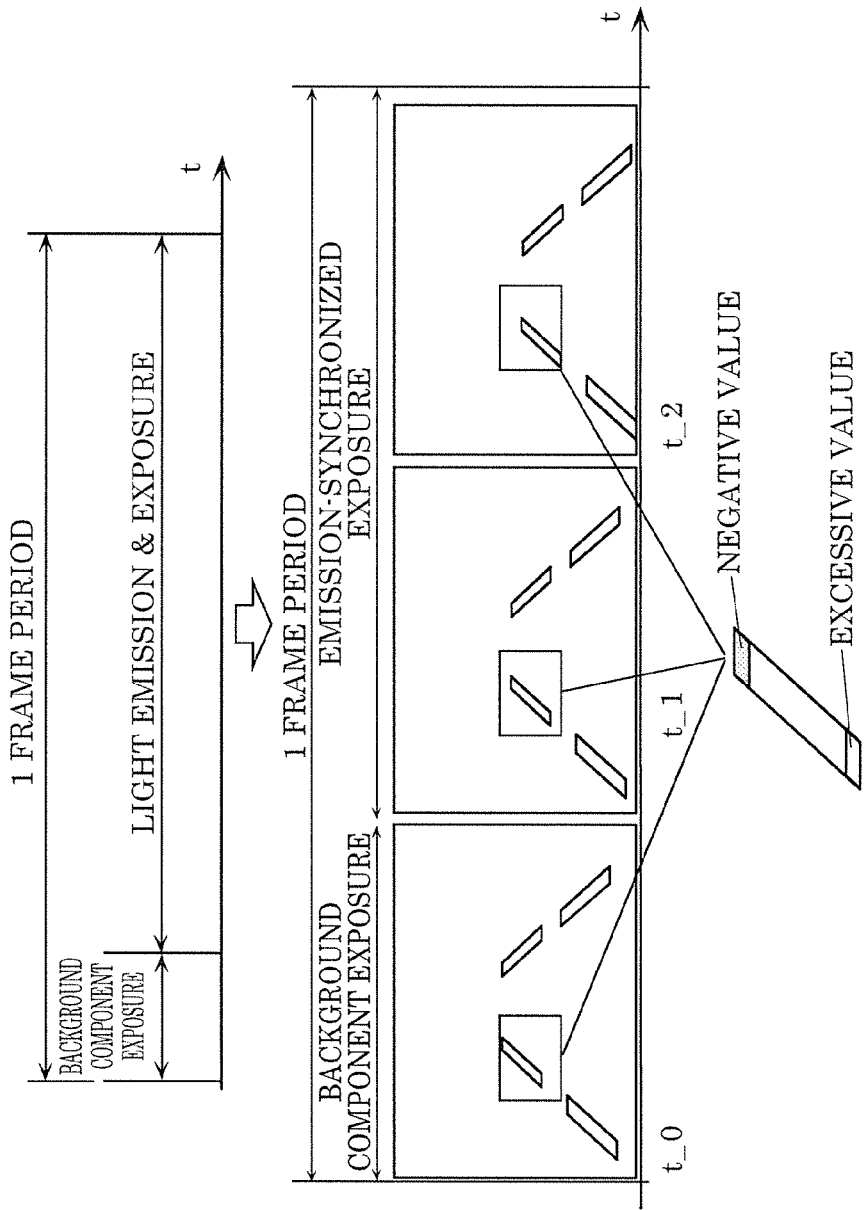
FIG. 4 is a schematic diagram showing how a white line looks when images are picked up in a traveling direction of an automobile.
Figure 5:
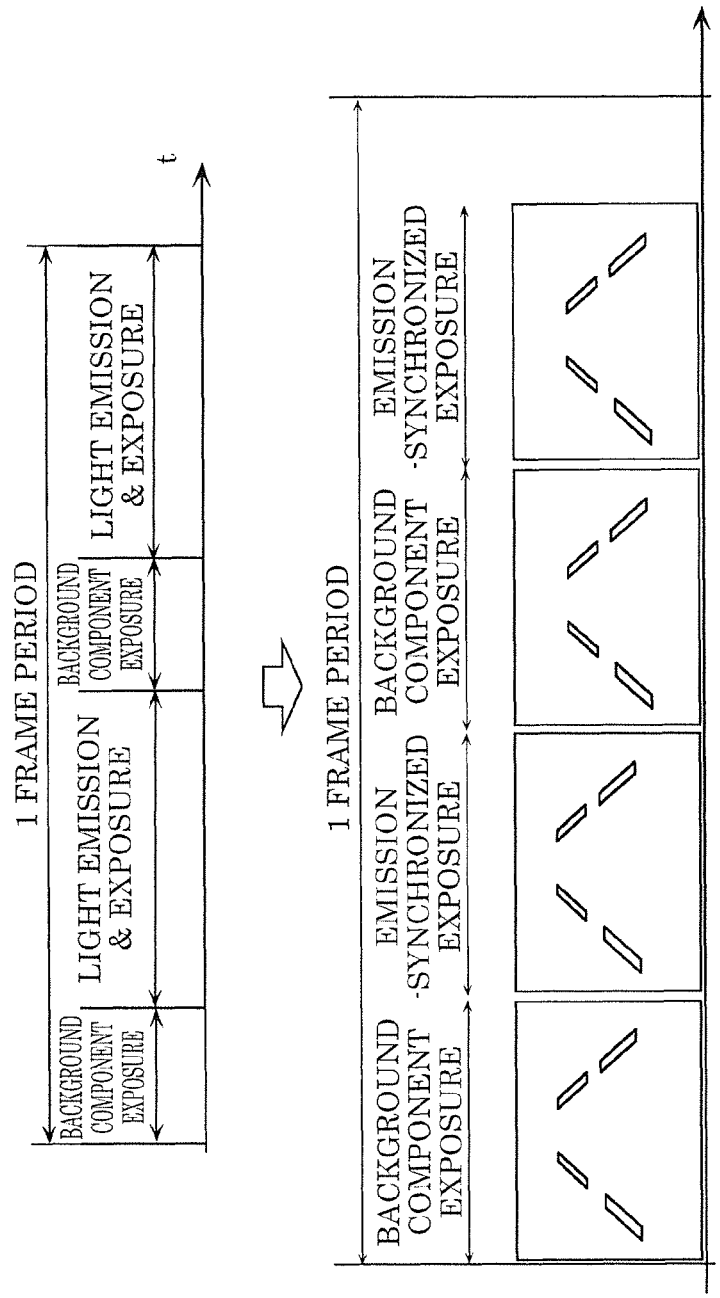
FIG. 5 is a schematic diagram showing how a white line looks if images are picked up in a traveling direction of an automobile.

If exposure to the background light component alone is made only at the head of a frame, when images are picked up in a traveling direction of an automobile, for example, as shown in FIG. 4, because a white line keeps on shifting, there occurs a difference in signal quantity between background light superimposed on an own emitted light component especially at the near end and far end of the white line and background light causing exposure at the head of a frame. However, if a signal of the background light component is updated by making exposure to only the background light component anew just before each exposure, the influence of time variation of the background light can be reduced as shown in FIG. 5. Similarly, such as near an entrance/exit of a tunnel, when plural image pickup ranges differing in the background light component are located close to one another in a travel range within one frame, the influence of time variation of the background light can be reduced as well.

Figure 6:
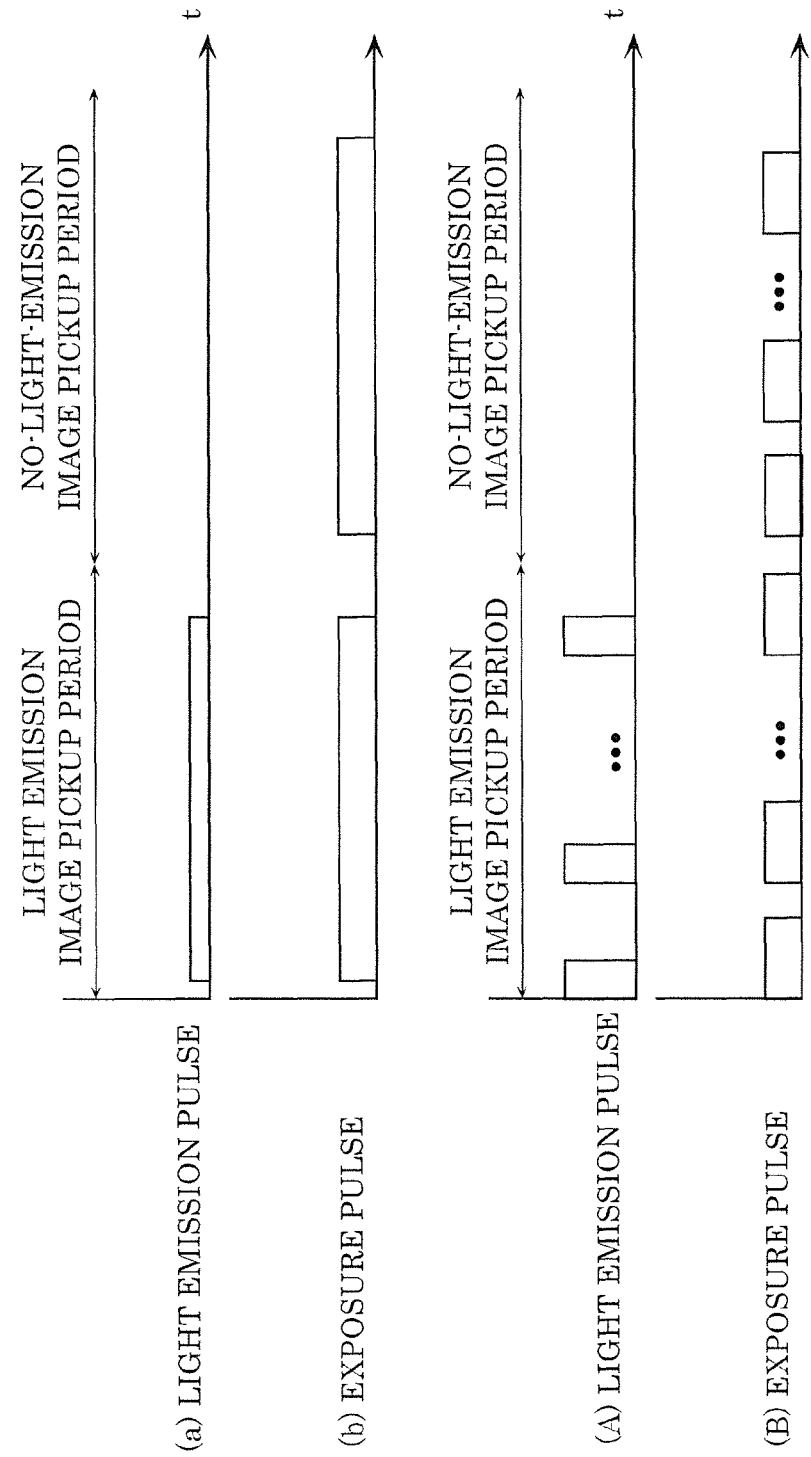
FIG. 6 is a timing chart showing differences in light emission timing and exposure timing between a comparative example and the embodiment.

FIG. 6 is a timing chart showing differences in light emission timing and exposure timing between a comparative example and the present embodiment. The light emission pulse in Part (a) of FIG. 6 and the exposure pulse in Part (b) of FIG. 6 correspond to the light emission timing and exposure timing in the comparative example. In the comparative example, one light emission pulse occurs in a light emission image pickup period and there is one corresponding exposure pulse as well. Normally, each light source has an upper performance limit in terms of the electric power needed to emit light per unit time. Therefore, continuous light emission results in low optical power.

On the other hand, the light emission pulse in Part (A) of FIG. 6 and the exposure pulse in Part (B) of FIG. 6 correspond to the light emission timing and exposure timing in the present embodiment. According to the present embodiment, plural light emission pulses are issued intermittently in a light emission image pickup period. By driving the light emission pulses in this way, it is possible to increase peak power of each light emission pulse while keeping average power substantially equal to the comparative example. Thus, a total accumulation time taken to receive substantially equal light quantity can be reduced. Consequently, an image formed by reflected light of own emitted light can be acquired as a main component, with the influence of background light curbed.

Also, by making exposure to light emission pulses N times (N is an integer greater than or equal to 2), images can be picked up using only own emitted light from short distance to long distance. Any signal in a distance interval from which no reflected light returns within the exposure period is a difference between a background light component and a background light component and substantially amounts to no signal. On the other hand, in a distance interval from which reflected light returns within the exposure period, a signal substantially solely due to reflected light is available.

By adding N signals differing in the exposure period, it is possible to pick up images using lighting from own emitted light as a main component while curbing the influence of background light without depending on distance. The addition operation can be performed, for example, in the case of signal processor 106 shown in FIGS. 13 and 14 described later, by providing frame memories in processors 304 and 314. Also, in the case of signal processor 106 shown in FIGS. 15 to 19 described later, if an accumulator is provided on the output side of buffer 404 or 415 and results of exposure made N times are accumulated, an image can be obtained as a result of image pickup carried out under lighting from own emitted light in a large distance range.

Figure 7:
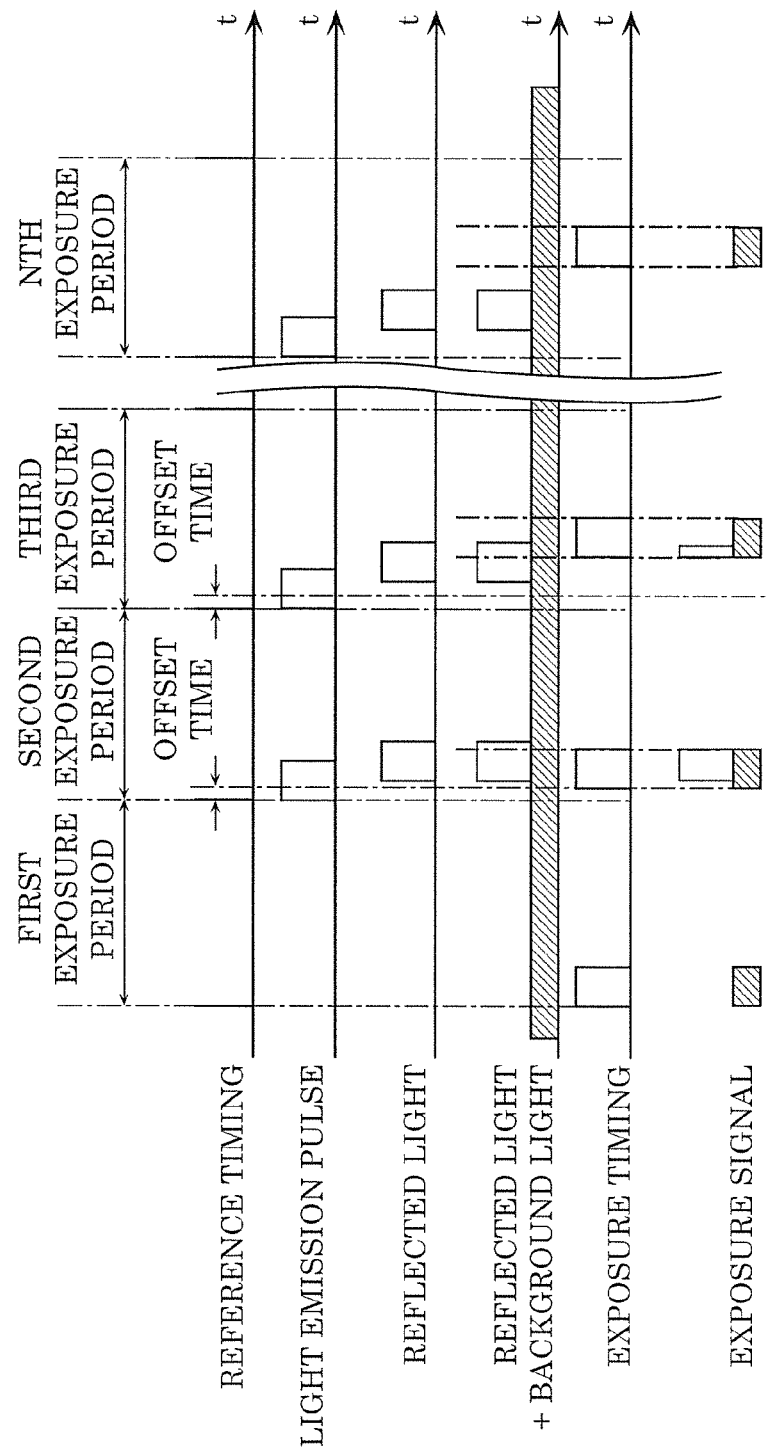
FIG. 7 is a timing chart showing a third drive mode of the projection image pickup device according to the embodiment.

FIG. 7 is a timing chart showing a third drive mode of projection image pickup device 100. The third drive mode involves picking up images by emphasizing only a distance range in a specific interval. In the third drive mode, exposure is started by delaying from a light emission pulse by a predetermined time (offset time) in the second exposure period. In so doing, exposure pulse width can be set as desired, and the distance range that can be emphasized in image pickup is extended according to the width. In the third exposure period, as with the first drive mode, the optical sensor is exposed in synchronization with a timing obtained by further adding a predetermined delay time (e.g., exposure time) in addition to the offset time, to the timing of the light emission pulse of pulsed-light emitter 102 and outputs a result to signal processor 106.

Note that although not illustrated, in the first exposure period, the background light component may be acquired by delaying from the reference timing by the offset time. By controlling the exposure timing in this way, it is possible to reduce the time lag between exposure in the first exposure period and exposure in the second exposure period and thereby inhibit motion blur.

Figure 8:
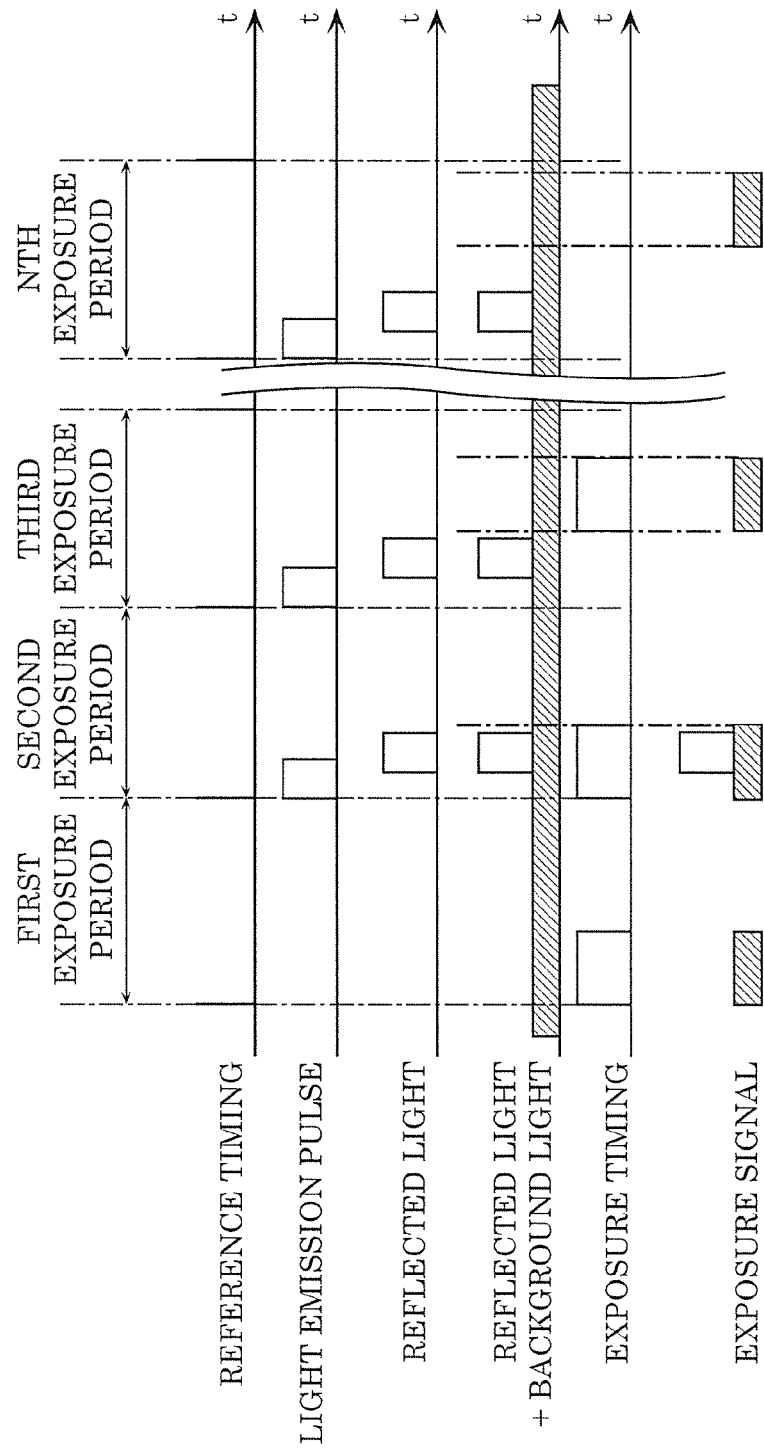
FIG. 8 is a timing chart showing a fourth drive mode of the projection image pickup device according to the embodiment.

FIG. 8 is a timing chart showing a fourth drive mode of projection image pickup device 100. The fourth drive mode allows images to be picked up from short distance to long distance under lighting from own emitted light. In the fourth drive mode, if exposure time longer than emission time is set by the reference timing generator in picking up images, the images can be acquired under lighting from own emitted light even from a long distance. The sum of the time interval from when pulsed-light emitter 102 emits light to when reflected light returns from an object located in the longest distance range covered and the light emission pulse duration equals the longest width of the exposure pulse. For example, if a maximum distance is 100 m, round-trip time of light is 666 ns, and if emission time is 100 ns, the sum of the round-trip time and emission time, i.e., 766 ns, is the pulse width of the exposure time.

Figure 9:
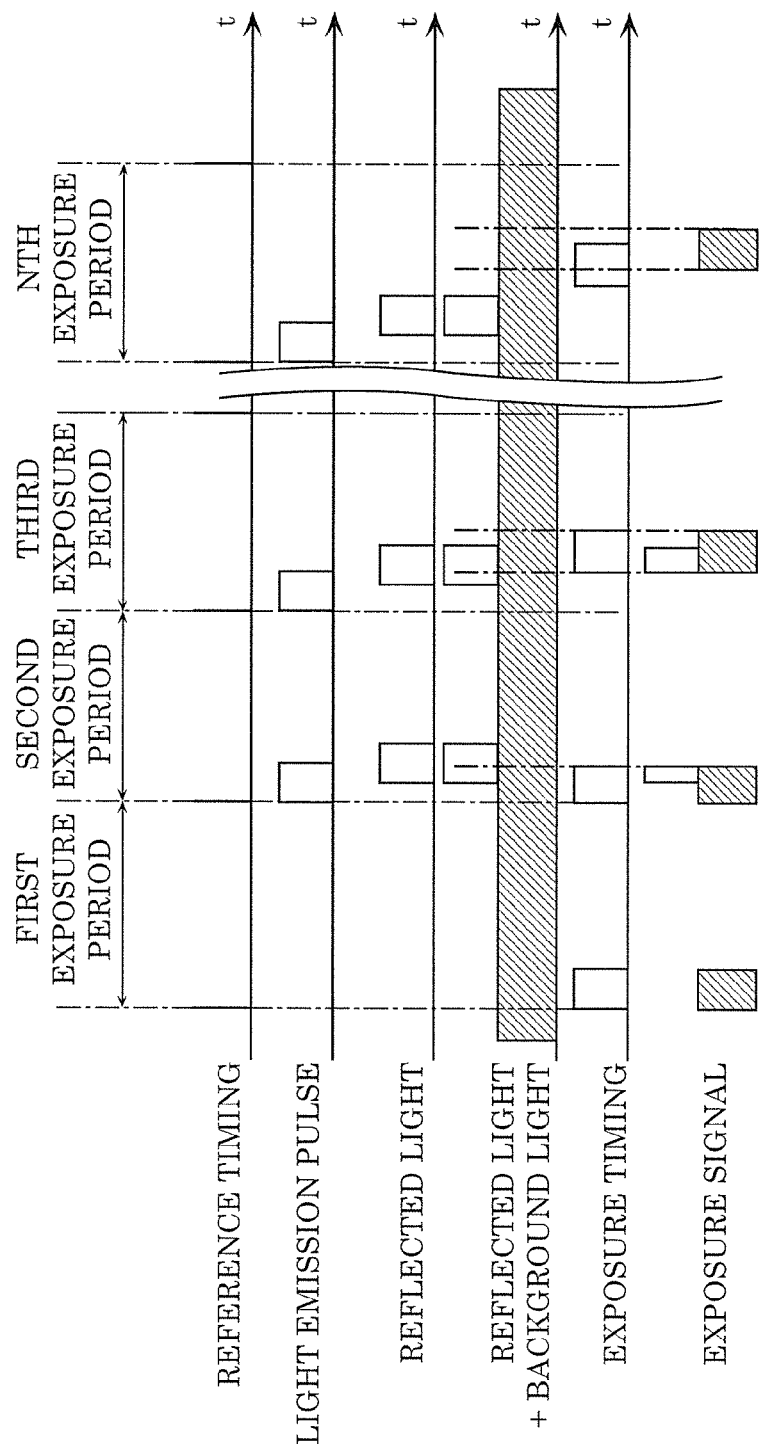
FIG. 9 is a timing chart showing a fifth drive mode of the projection image pickup device according to the embodiment.

However, there arises a problem in a scene in which high-luminance light is superimposed on a subject. Examples include a scene in which light from headlamps of an oncoming vehicle is specularly reflected by a puddle covering a white line on the road. In so doing, as shown in FIG. 9, if luminance of return light (own emitted light returning to the own apparatus after being reflected off the white line) from the white line desired to be observed is low relative to high-luminance background light, when signal processor 106 finds a difference between a signal under no lighting and a signal under lighting, the return light from the white line exhibits significant signal degradation. The reason is as follows: because the higher the intensity of the background light, the higher the shot noise of the background light, even if a signal due to the background light is subtracted from a signal due to the reflected light plus the background light, the influence of noise is relatively large.

Figure 10:
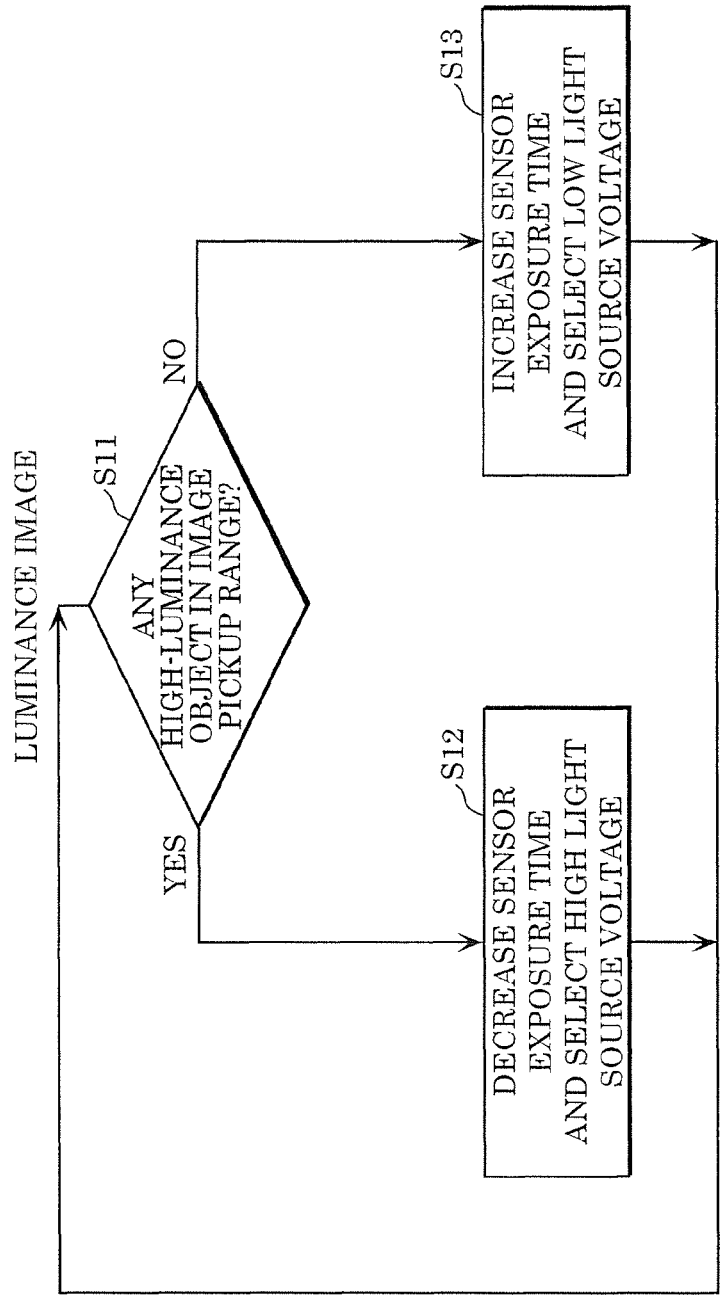
FIG. 10 is a flowchart showing a driving method according to the embodiment.
Figure 11:
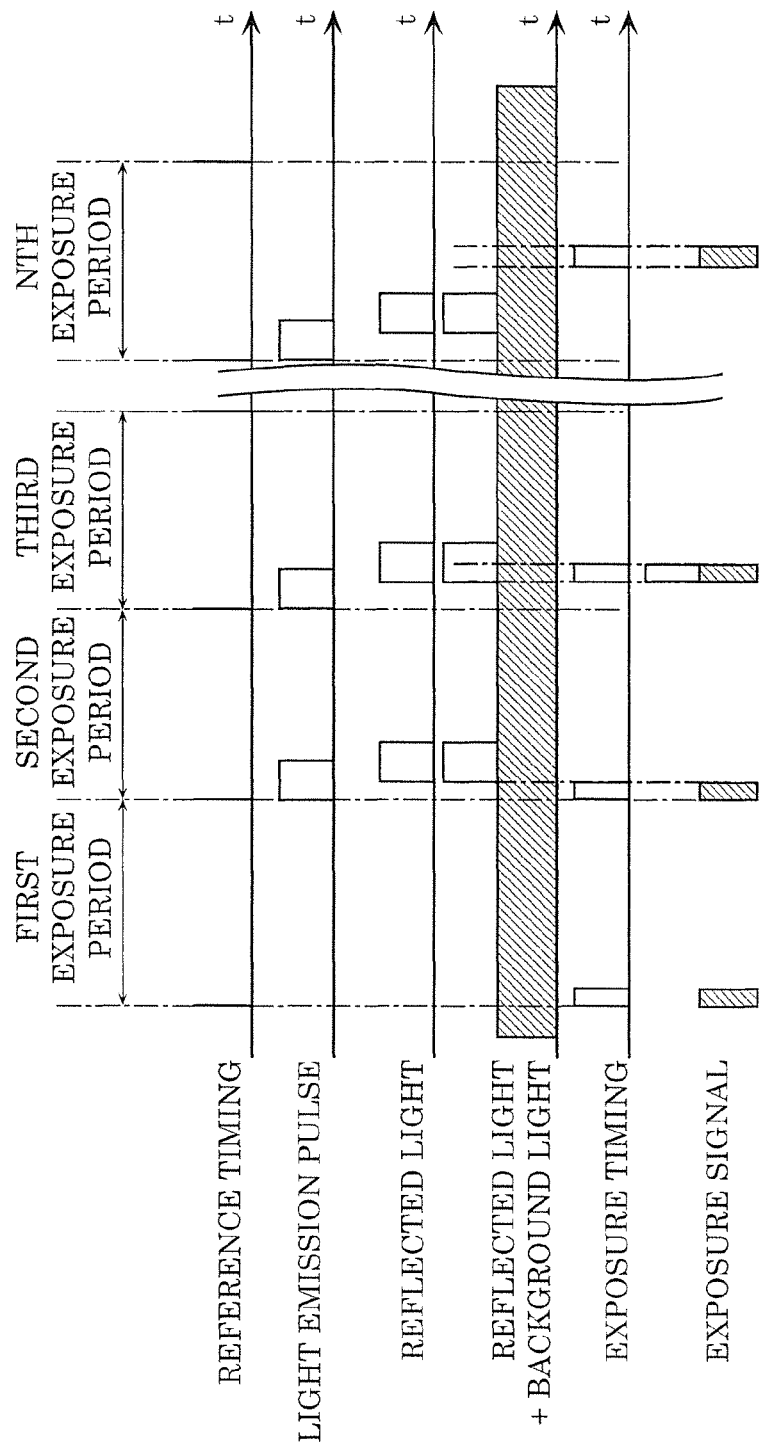
FIG. 11 is a timing chart when a signal strength ratio of signal light to background light is high.

FIG. 10 is a flowchart showing a driving method according to the present embodiment. First, projection image pickup device 100 observes a luminance image and determines whether there is any high-luminance object (S11). For example, if there are pixels in excess of a predetermined signal quantity or if saturation is detected, by determining that there is a high-luminance object (Yes in S11), projection image pickup device 100 switches the voltage of pulsed-light emitter 102 to a high voltage and decreases the exposure time to increase emission intensity (S12). Here, the exposure time may be minimized. Also, when the voltage of pulsed-light emitter 102 is maximum, the voltage is left as it is. As a result, because a signal strength ratio of signal light to background light increases, a light receiving conditions such as shown in FIG. 11 can be achieved. Using this driving method, signal processor 106 performs a subtraction process between output from optical sensor 104 under lighting of pulsed-light emitter 102 and output from optical sensor 104 under no lighting of pulsed-light emitter 102, thereby making it possible to extract only a signal component while inhibiting signal degradation.

On the other hand, when the luminance image is observed, if there is no pixels in excess of the predetermined signal quantity or if saturation is not detected, by determining that there is no high-luminance object (No in S11), projection image pickup device 100 switches the voltage of pulsed-light emitter 102 to a low voltage and increases the exposure time to decrease emission intensity (S13). Here, the exposure time may be maximized. Also, when the voltage of pulsed-light emitter 102 is minimum, the voltage is left as it is. As a result, in a situation in which there is no high-luminance object, a frame rate can be increased by increasing the exposure time only to the extent that optical sensor 104 will not be saturated and thereby reducing the number of exposures per frame.

Figure 12:
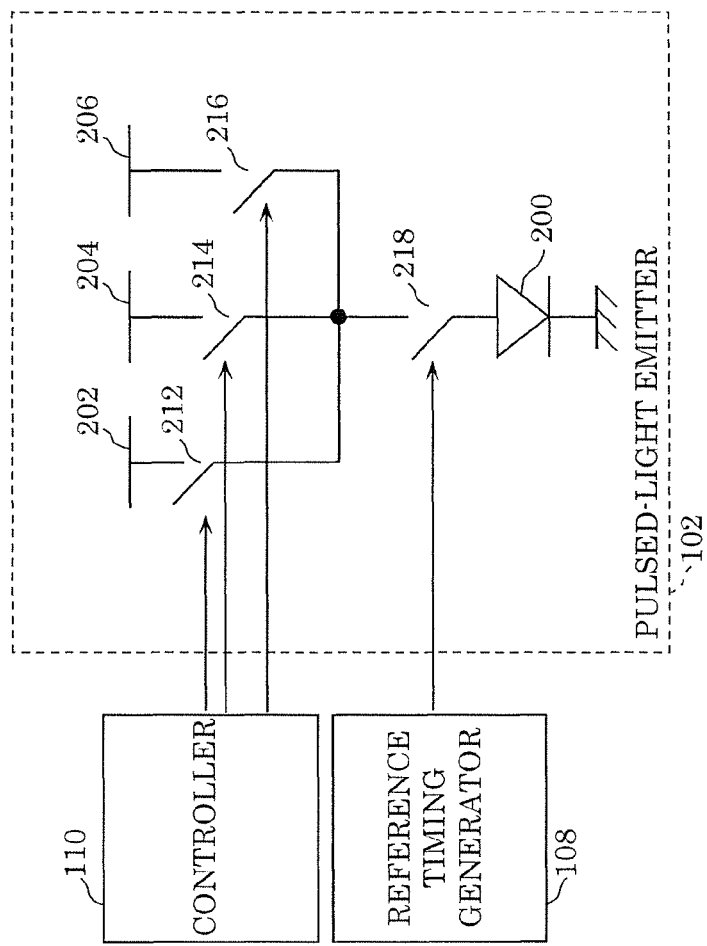
FIG. 12 is a circuit diagram showing a circuit configuration example of a pulsed-light emitter according to the embodiment.

FIG. 12 shows a configuration example of pulsed-light emitter 102 that implements the intensity modulation described above. Pulsed-light emitter 102 includes laser diode 200 and voltage sources that apply voltages to laser diode 200. The configuration example shown in FIG. 12 includes three voltage sources, namely first voltage source 202, second voltage source 204, and third voltage source 206, which vary in supply voltage magnitude from one another.

A control signal for use to select one of the voltage sources to be connected to laser diode 200 is inputted to controller 110 as a result of determination in the flow. Switch 212, switch 214, and switch 216 open and close in response to the control signal. Reference timing generator 108 brings switch 218 into conduction during a light emission period, thereby connects the selected voltage source with laser diode 200, and thereby controls light emission timing. Note that when control over light emission timing is included in the control performed by controller 110 over switch 212, switch 214, or switch 216, switch 218 may be omitted.

Figure 13:
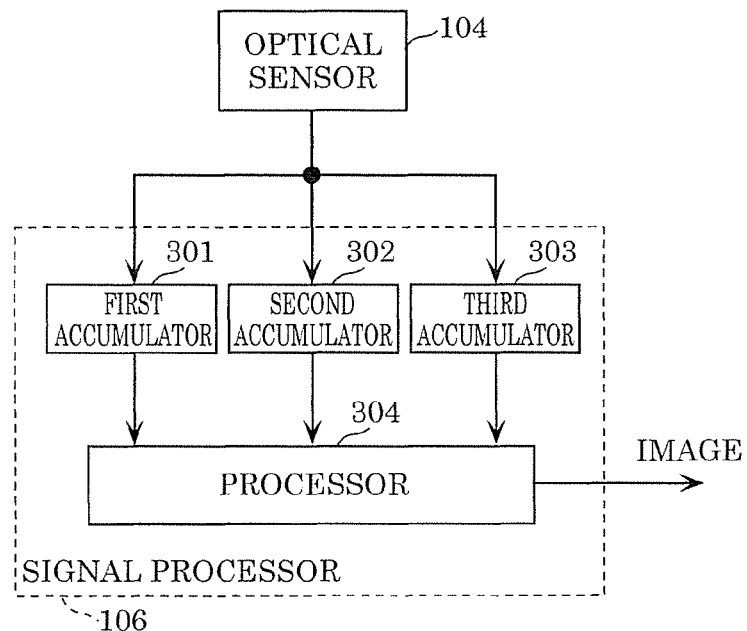
FIG. 13 is a block diagram showing a first block configuration example of a signal processor according to the embodiment.

FIG. 13 shows a first block configuration example of signal processor 106. Signals outputted from optical sensor 104 are integrated in first accumulator 301, second accumulator 302, and third accumulator 303. The signals accumulated in first accumulator 301, the signals accumulated in second accumulator 302, and the signals accumulated in third accumulator all differ in time. For example, first accumulator 301 accumulates signals originating from background light (first exposure period), second accumulator 302 accumulates signals originating from the sum of a component synchronized with light emission pulses of reflected light and the background light (second exposure period), and third accumulator 303 accumulates signals originating from the sum of a component phase-shifted from the light emission pulses of reflected light by a predetermined delay and the background light (third exposure period).

Processor 304 can obtain that component (first differential signal) of the reflected light of a light emission pulse which is synchronized with the light emission pulse, for example, by subtracting a signal in first accumulator 301 from a signal in second accumulator 302 and can obtain that component (second differential signal) of the reflected light of the light emission pulse which is phase-shifted from the light emission pulse by a predetermined delay by subtracting the signal in first accumulator 301 from a signal in third accumulator 303. By adding together the two signals obtained in this way, the reflected light component of the light emission pulse can be obtained. First accumulator 301, second accumulator 302, third accumulator 303, and processor 304 may be disposed, for example, in pixels of an image sensor, in an area different from an image pickup area, or an external memory outside the image sensor.

Figure 14:
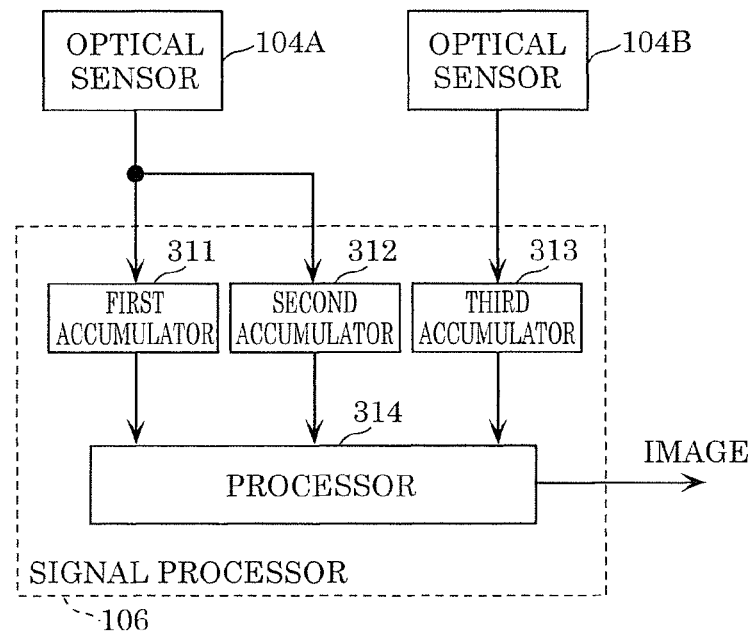
FIG. 14 is a block diagram showing a second block configuration example of the signal processor according to the embodiment.

FIG. 14 shows a second block configuration example of signal processor 106. The second block configuration example accumulates exposure times of same time. In the present configuration example, first optical sensor 104A and second optical sensor 104B are configured, for example, to receive lights of different wavelengths, and the wavelength of the light emitted by pulsed-light emitter 102 is received by only one of the optical sensor assemblies. The wavelength received by the other optical sensor is close to the former wavelength (e.g., a difference between the wavelengths is approximately 10 nm to 50 nm). Desirably, first optical sensor 104A and second optical sensor 104B receive lights in exclusively different wavelength ranges that do not overlap each other, but the wavelength ranges may partially overlap each other.

First optical sensor 104A and second optical sensor 104B may be mounted in different chips, single pixels adjacent to each other in a pixel row direction, pixel column direction, or diagonal direction, or adjacent pixel columns or adjacent pixel rows. When first optical sensor 104A and second optical sensor 104B are mounted in different chips, an optical system is configured such that reflected light from a same object will enter first optical sensor 104A and second optical sensor 104B. Examples of possible methods include installing a half mirror or prism on an optical axis. Then, a background light component is obtained by exposing one of the optical sensor assemblies without emitting light from pulsed-light emitter 102. Consequently, a video resulting only from light emission signals identical in time can be processed into an image by the processor.

Specifically, by emitting light from pulsed-light emitter 102 and exposing first optical sensor 104A and second optical sensor 104B simultaneously, output of optical sensor 104A is accumulated in first accumulator 311 and output of optical sensor 104B is accumulated in third accumulator 313. Furthermore, optical sensor 104A is exposed using timing obtained by adding a predetermined delay time to the light emission timing of pulsed-light emitter 102 and outputs a result to second accumulator 312. When a signal obtained by subtracting a signal of third accumulator 313 from a signal of first accumulator 311 and a signal obtained by subtracting the signal of third accumulator 313 from a signal of second accumulator 312 are added together, the reflected light component of the light emission pulse can be obtained.

Figure 15:
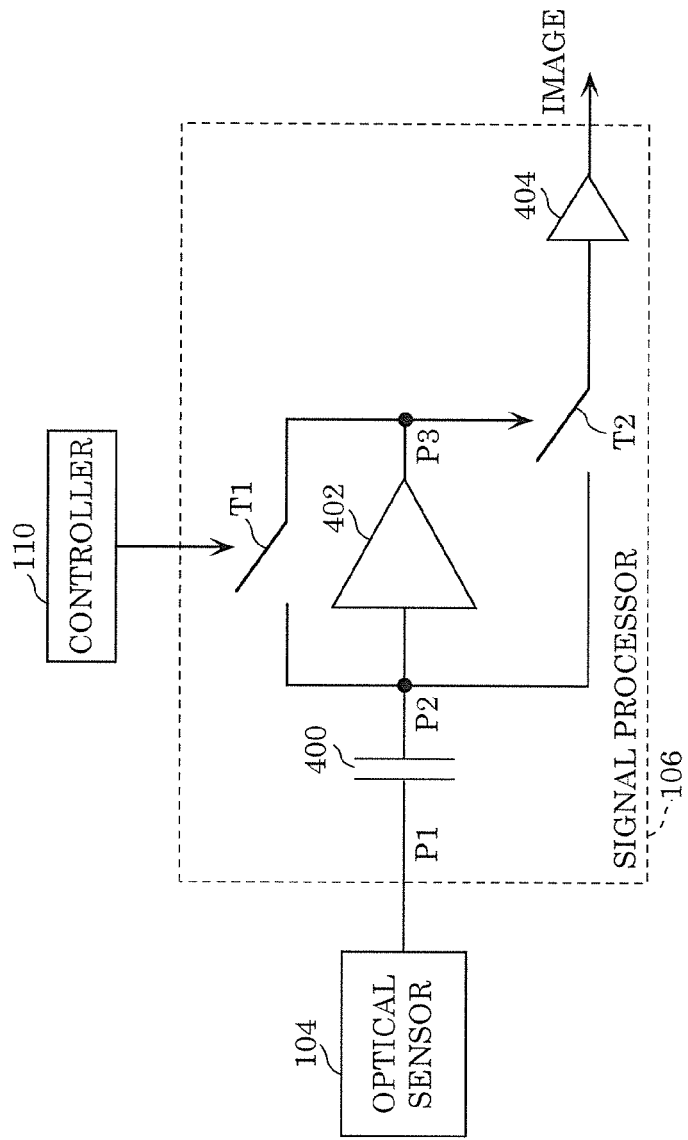
FIG. 15 is a circuit diagram showing a first circuit configuration example of the signal processor according to the embodiment.

FIG. 15 shows a first circuit configuration example of signal processor 106. Signal processor 106 includes capacitor 400 connected in series with output of optical sensor 104, amplifier 402 that allows a threshold to be set, switch T1 (first switch) used to set a threshold voltage of amplifier 402, switch T2 (second switch) controlled by an output signal of amplifier 402, and buffer 404 disposed on the output side of switch T2. Capacitor 400 is connected to optical sensor 104 via terminal P1. Input-side terminal P2 and output-side terminal P3 of amplifier 402 are connected with each other via switch T1. Switch T1 is opened and closed by controller 110. Power supply voltage Vdd is applied to amplifier 402.

When switch T1 is turned on, an output voltage from optical sensor 104 is set to the threshold voltage of amplifier 402. In so doing, output voltage Vbg from optical sensor 104 under no lighting is set to the threshold voltage, and then output voltage Vsig from optical sensor 104 during a period in which pulsed light is emitted is used as an input to amplifier 402. Consequently, when the output voltage from optical sensor 104 is higher than the threshold voltage, output of amplifier 402 goes high, turning on switch T2. Consequently, potential (Vdd/2+Vsig−Vbg) at terminal P2, which is a connection point between amplifier 402 and capacitor 400, is outputted as a pixel output to buffer 404. From buffer 404, the potential is outputted out of the present apparatus as the pixel output. With this configuration, only the signals resulting from light emission are outputted from buffer 404, allowing the influence of background light to be reduced.

Capacitor 400, amplifier 402, and buffer 404 may be disposed inside or outside a pixel area of an image sensor or outside the image sensor. Also, each of switch T1 and switch T2 may be a semiconductor switch, i.e., an nMOS switch or pMOS switch, and either of the semiconductor switches is selected according to the polarity of amplifier 402.

Figure 16:
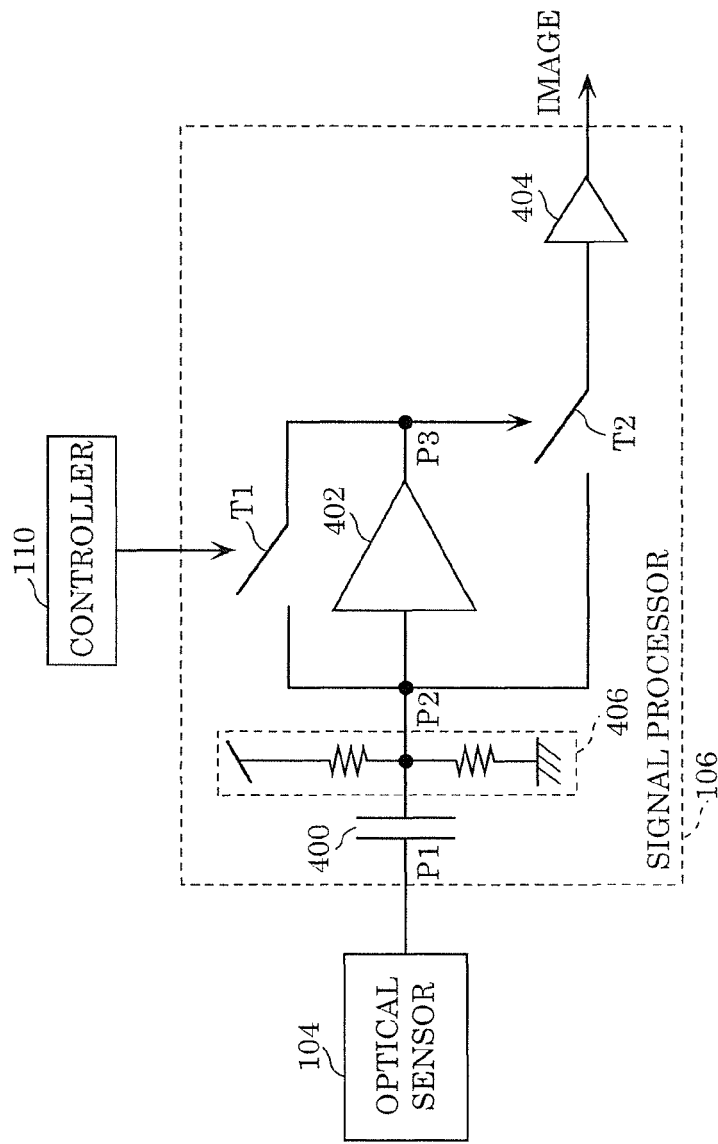
FIG. 16 is a circuit diagram showing a second circuit configuration example of the signal processor according to the embodiment.

FIG. 16 shows a second circuit configuration example of signal processor 106. Compared to the first circuit configuration example, the second circuit configuration example further includes bias voltage application circuit 406 between capacitor 400 and terminal P2. With this configuration, voltage obtained by applying an offset voltage to output voltage Vbg from optical sensor 104 under no lighting can be set as a threshold voltage. Consequently, the influence of shot noise of background light can be reduced.

Figure 17:
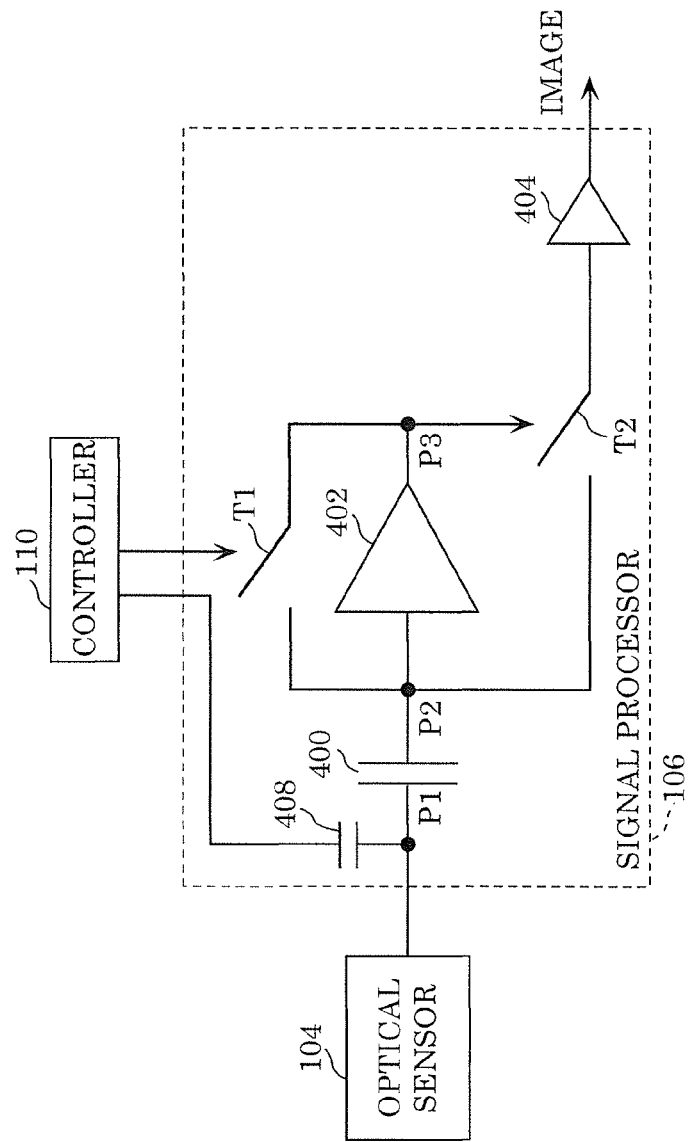
FIG. 17 is a circuit diagram showing a third circuit configuration example of the signal processor according to the embodiment.

FIG. 17 shows a third circuit configuration example of signal processor 106. Compared to the first circuit configuration example, the third circuit configuration example further includes bias voltage application capacitor 408 between optical sensor 104 and capacitor 400, bias voltage application capacitor 408 being connected to controller 110. The bias voltage may be set in advance to a predetermined voltage or may be varied according to the distance range used for image pickup. Desirably, the voltage to be applied is a voltage obtained by adding a predetermined intercept to a voltage inversely proportional to the square of a desired distance for image pickup, but this is not restrictive. With this configuration, generation of flares due to light reflected off a nearby object can be curbed, timed with image pickup carried out in a short distance range.

Figure 18:
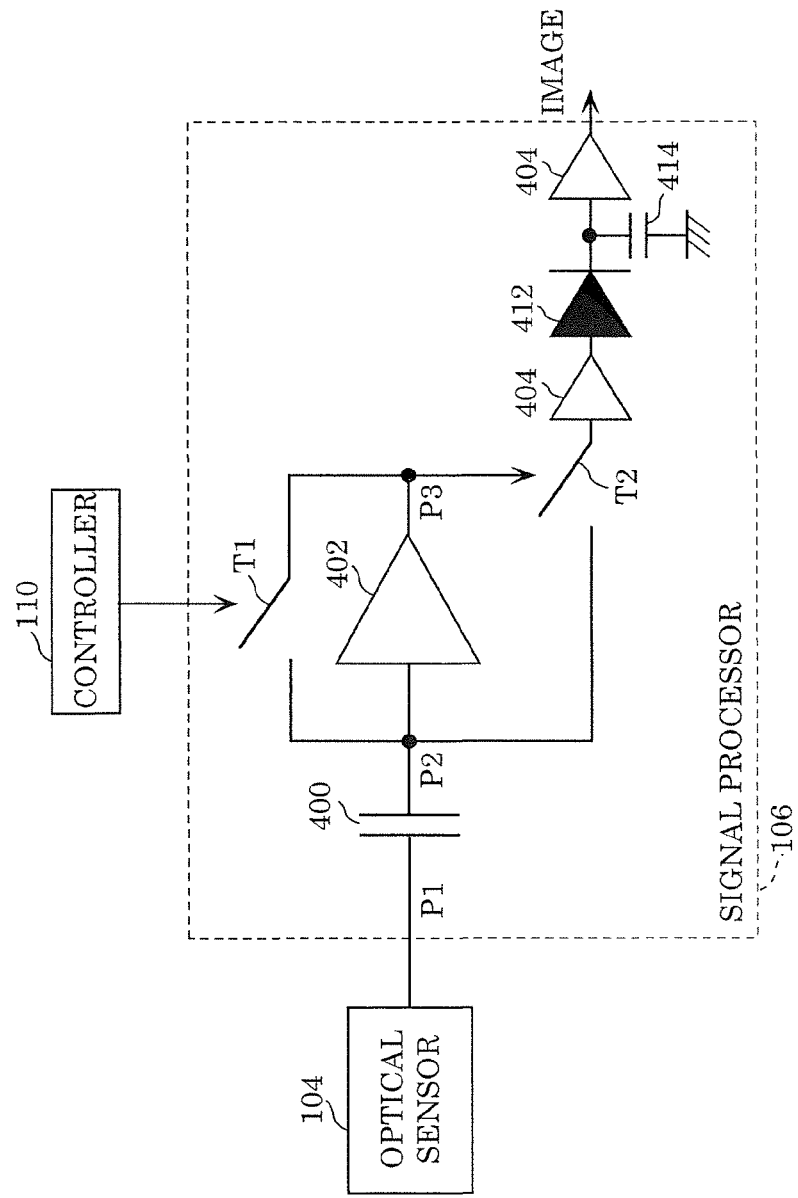
FIG. 18 is a circuit diagram showing a fourth circuit configuration example of the signal processor according to the embodiment.

FIG. 18 shows a fourth circuit configuration example of signal processor 106. Compared to the first circuit configuration example, the fourth circuit configuration example further includes diode 412, capacitor 414, and buffer 415 on the output side of buffer 404. With this configuration, the largest signal quantity of all exposure timings can be outputted.

Figure 19:
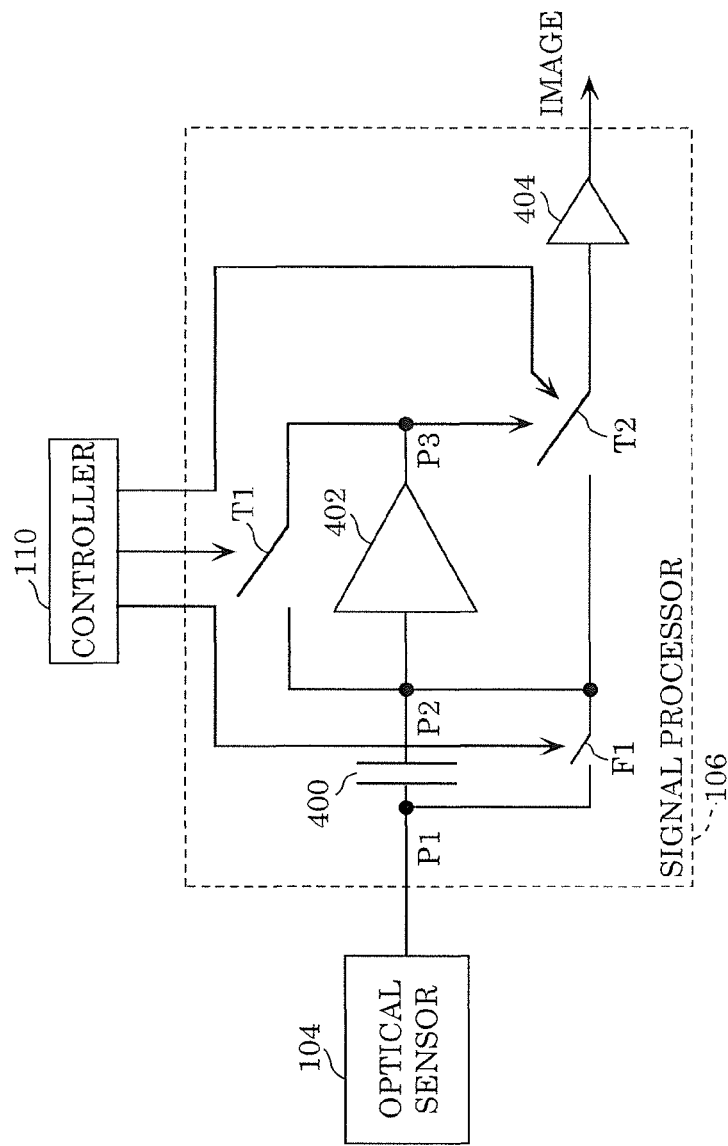
FIG. 19 is a circuit diagram showing a fifth circuit configuration example of the signal processor according to the embodiment.

FIG. 19 shows a fifth circuit configuration example of signal processor 106. The fifth circuit configuration example of signal processor 106 can secure functional safety. For example, in the first circuit configuration example shown in FIG. 15, if an accident causes optical sensor 104 to enter a failure mode in which optical sensor 104 outputs a constant signal, signal processor 106 outputs substantially no signal. To detect this, in addition to output after threshold determination, a path for use to directly output the output voltage from optical sensor 104 becomes necessary.

Thus, compared to the first circuit configuration example, the fifth circuit configuration example further includes switch F1 for use to cause a short circuit between terminal P1 and terminal P2. As controller 110 turns on switch F1 and switch T2, the very signal from optical sensor 104 can be outputted from signal processor 106. A frame is inserted to output the very signal from optical sensor 104 on startup of the apparatus or intermittently during operation, and the output is verified by signal processing at a subsequent stage. For example, if there is any black defect or white defect pixel, by storing the pixel address on the process side and interpolating the pixel with neighboring pixels, the system can be operated stably.

As described above, a projection image pickup device according to the present disclosure includes: a pulsed-light emitter; an optical sensor; a reference timing generator that generates a signal indicating an operation reference timing; a controller; and a signal processor. During a first exposure period in a frame, the controller performs exposure control over the optical sensor in synchronization with the operation reference timing. During a second exposure period in the frame, the controller performs exposure control over the optical sensor in synchronization with the operation reference timing and causes the pulsed-light emitter to emit light in synchronization with the operation reference timing. During a third exposure period in the frame, the controller performs exposure control over the optical sensor in synchronization with a timing obtained by adding a predetermined delay time to the operation reference timing and causes the pulsed-light emitter to emit light in synchronization with the operation reference timing. The pulsed-light emitter emits light according to light emission control of the controller. The optical sensor is exposed according to the exposure control of the controller and outputs an output signal indicating an amount of exposure to the signal processor. The signal processor sets a differential signal between an output signal from the optical sensor in the second exposure period and an output signal from the optical sensor in the first exposure period as a first differential signal, sets a differential signal between an output signal from the optical sensor in the third exposure period and the output signal from the optical sensor in the first exposure period as a second differential signal, and outputs a sum total of at least two differential signals including the first differential signal and the second differential signal.

Here, the frame may include the first exposure period to an Nth exposure period (N is an integer greater than or equal to 4). During a Kth exposure period in the frame (K is an integer between 3 and N, both inclusive), the controller may perform exposure control over the optical sensor in synchronization with a timing obtained by adding a predetermined delay time to the operation reference timing in a (K−1)th exposure period and cause the pulsed-light emitter to emit light in synchronization with the operation reference timing. The signal processor may set a differential signal between an output signal from the optical sensor in the Kth exposure period and the output signal from the optical sensor in the first exposure period as a (K−1)th differential signal, and output a sum total of differential signals from the first differential signal to an (N−1)th differential signal as a result.

Here, in at least one exposure period of exposure periods from the third exposure period to the Nth exposure period, the controller may provide a period during which the controller performs same control as in the first exposure period, the period being provided just before a start of the at least one exposure period.

Here, the signal processor may output the sum total of differential signals from the first differential signal to the (N−1)th differential signal excluding any differential signal smaller than a predetermined threshold.

Here, the signal processor may set the predetermined threshold for each of the first differential signal to the (N−1)th differential signal.

Here, in at least one exposure period of exposure periods from the second exposure period to the Nth exposure period, the controller may change the emission intensity of the pulsed-light emitter from the emission intensity used in an immediately preceding exposure period.

Here, in at least one exposure period of exposure periods from the second exposure period to the Nth exposure period, the controller may change the sensor sensitivity of the optical sensor from the sensor sensitivity used in an immediately preceding exposure period.

Here, in at least one exposure period of exposure periods from the second exposure period to the Nth exposure period, the controller may change the exposure time of the optical sensor from the exposure time used in an immediately preceding exposure period.

Here, the signal processor may include a first capacitor connected in series with the optical sensor, on an output side of the optical sensor, an amplifier on an output side of the first capacitor, a first switch that causes a short circuit between an input terminal and an output terminal of the amplifier, and a second switch controlled by an output signal of the amplifier. The first switch may be controlled by a signal from the controller. When the second switch is turned on, the signal processor may output a voltage at the input terminal of the amplifier.

Here, the signal processor may further include a buffer between the second switch and an output of the signal processor, and the buffer may receive input of the voltage at the input terminal of the amplifier and output the voltage as an output signal from the signal processor.

Here, the signal processor may further include a bias voltage application circuit between the first capacitor and the input terminal of the amplifier.

Here, a bias voltage generated by the bias voltage application circuit may be variable under control of the controller.

Here, the signal processor may further include a through-switch connected in parallel to the first capacitor, and an output side of the through-switch may be connected to the second switch.

Here, the signal processor may further include a diode and a second capacitor on an output side of the second switch.

A projection image pickup method according to the present disclosure is a projection image pickup method for an apparatus that includes a controller, a pulsed-light emitter that emits light according to light emission control of the controller, an optical sensor that is exposed according to exposure control of the controller and generates an output signal indicating an amount of exposure, a reference timing generator that generates a signal indicating an operation reference timing, and a signal processor, the method includes: performing exposure control over the optical sensor in synchronization with the operation reference timing, by the controller, during a first exposure period in a frame; performing exposure control over the optical sensor in synchronization with the operation reference timing and causing the pulsed-light emitter to emit light in synchronization with the operation reference timing, by the controller, during a second exposure period in the frame; performing exposure control over the optical sensor in synchronization with a timing obtained by adding a predetermined delay time to the operation reference timing and causing the pulsed-light emitter to emit light in synchronization with the operation reference timing, by the controller, during a third exposure period in the frame; calculating a differential signal between an output signal from the optical sensor in the second exposure period and an output signal from the optical sensor in the first exposure period as a first differential signal, by the signal processor; calculating a differential signal between an output signal from the optical sensor in the third exposure period and the output signal from the optical sensor in the first exposure period as a second differential signal, by the signal processor; and calculating a sum total of at least two differential signals including the first differential signal and the second differential signal, by the signal processor.

INDUSTRIAL APPLICABILITY

The present disclosure is applicable, for example, to a projection image pickup device such as an in-vehicle camera and a projection image pickup method.

The invention claimed is:

1. A projection image pickup device, comprising:
a pulsed-light emitter;
an optical sensor;
a reference timing generator that generates a signal indicating an operation reference timing;
a controller; and
a signal processor,
wherein during a first exposure period in a frame, the controller performs exposure control over the optical sensor,
during a second exposure period in the frame, the controller causes the pulsed-light emitter to emit light in synchronization with the operation reference timing and performs exposure control over the optical sensor,
during a third exposure period in the frame, the controller causes the pulsed-light emitter to emit light in synchronization with the operation reference timing and performs exposure control over the optical sensor in synchronization with a timing obtained by adding a predetermined delay time to the operation reference timing,
the pulsed-light emitter emits light according to light emission control of the controller,
the optical sensor is exposed according to the exposure control of the controller and outputs an output signal indicating an amount of exposure to the signal processor, and
the signal processor:
sets a differential signal between an output signal from the optical sensor in the second exposure period and an output signal from the optical sensor in the first exposure period as a first differential signal;
sets a differential signal between an output signal from the optical sensor in the third exposure period and the output signal from the optical sensor in the first exposure period as a second differential signal; and
outputs a sum total of at least two differential signals including the first differential signal and the second differential signal.

2. The projection image pickup device according to claim 1, wherein
the frame includes the first exposure period to an Nth exposure period, where N is an integer greater than or equal to 4,
during a Kth exposure period in the frame, where K is an integer between 3 and N, both inclusive, the controller causes the pulsed-light emitter to emit light in synchronization with the operation reference timing in a (K−1)th exposure period and performs exposure control over the optical sensor, and
the signal processor:
sets a differential signal between an output signal from the optical sensor in the Kth exposure period and the output signal from the optical sensor in the first exposure period as a (K−1)th differential signal; and
outputs a sum total of differential signals from the first differential signal to an (N−1)th differential signal as a result.

3. The projection image pickup device according to claim 2, wherein
in at least one exposure period of exposure periods from the third exposure period to the Nth exposure period, the controller provides a period during which the controller performs same control as in the first exposure period, the period being provided just before a start of the at least one exposure period.

4. The projection image pickup device according to claim 2, wherein
the signal processor outputs the sum total of differential signals from the first differential signal to the (N−1)th differential signal excluding any differential signal smaller than a predetermined threshold.

5. The projection image pickup device according to claim 4, wherein
the signal processor sets the predetermined threshold for each of the first differential signal to the (N−1)th differential signal.

6. The projection image pickup device according to claim 2, wherein
in at least one exposure period of exposure periods from the second exposure period to the Nth exposure period, the controller changes emission intensity of the pulsed-light emitter from emission intensity used in an immediately preceding exposure period.

7. The projection image pickup device according to claim 2, wherein
in at least one exposure period of exposure periods from the second exposure period to the Nth exposure period, the controller changes sensor sensitivity of the optical sensor from sensor sensitivity used in an immediately preceding exposure period.

8. The projection image pickup device according to claim 2, wherein
in at least one exposure period of exposure periods from the second exposure period to the Nth exposure period, the controller changes exposure time of the optical sensor from exposure time used in an immediately preceding exposure period.

9. The projection image pickup device according to claim 1, wherein
the signal processor includes:
a first capacitor connected in series with the optical sensor, on an output side of the optical sensor;
an amplifier on an output side of the first capacitor;
a first switch that causes a short circuit between an input terminal and an output terminal of the amplifier; and
a second switch controlled by an output signal of the amplifier,
the first switch is controlled by a signal from the controller, and
when the second switch is turned on, the signal processor outputs a voltage at the input terminal of the amplifier.

10. The projection image pickup device according to claim 9, wherein
the signal processor further includes a buffer between the second switch and an output of the signal processor, and
the buffer receives input of the voltage at the input terminal of the amplifier and outputs the voltage as an output signal from the signal processor.

11. The projection image pickup device according to claim 9, wherein
the signal processor further includes a bias voltage application circuit between the first capacitor and the input terminal of the amplifier.

12. The projection image pickup device according to claim 11, wherein
a bias voltage generated by the bias voltage application circuit is variable under control of the controller.

13. The projection image pickup device according to claim 9, wherein
the signal processor further includes a through-switch connected in parallel to the first capacitor, and
an output side of the through-switch is connected to the second switch.

14. The projection image pickup device according to claim 9, wherein
the signal processor further includes a diode and a second capacitor on an output side of the second switch.

15. A projection image pickup method for an apparatus that includes a controller, a pulsed-light emitter that emits light according to light emission control of the controller, an optical sensor that is exposed according to exposure control of the controller and generates an output signal indicating an amount of exposure, a reference timing generator that generates a signal indicating an operation reference timing, and a signal processor, the method comprising:
performing exposure control over the optical sensor in synchronization with the operation reference timing, by the controller, during a first exposure period in a frame;
causing the pulsed-light emitter to emit light in synchronization with the operation reference timing and performing exposure control over the optical sensor, by the controller, during a second exposure period in the frame;
causing the pulsed-light emitter to emit light in synchronization with the operation reference timing and performing exposure control over the optical sensor in synchronization with a timing obtained by adding a predetermined delay time to the operation reference timing, by the controller, during a third exposure period in the frame;
calculating a differential signal between an output signal from the optical sensor in the second exposure period and an output signal from the optical sensor in the first exposure period as a first differential signal, by the signal processor;
calculating a differential signal between an output signal from the optical sensor in the third exposure period and the output signal from the optical sensor in the first exposure period as a second differential signal, by the signal processor; and
calculating a sum total of at least two differential signals including the first differential signal and the second differential signal, by the signal processor.

16. A projection image pickup device, comprising:
a pulsed-light emitter;
an optical sensor;
a reference timing generator that generates a signal indicating an operation reference timing;
a controller; and
a signal processor,
wherein during a first exposure period in a frame, the controller performs exposure control over the optical sensor in synchronization with the operation reference timing,
during a second exposure period in the frame, the controller causes the pulsed-light emitter to emit light in synchronization with the operation reference timing and performs exposure control over the optical sensor,
during a third exposure period in the frame, the controller causes the pulsed-light emitter to emit light in synchronization with the operation reference timing and performs exposure control over the optical sensor in synchronization with a timing obtained by adding a predetermined delay time to the operation reference timing,
the pulsed-light emitter emits light according to light emission control of the controller,
the optical sensor is exposed according to the exposure control of the controller and outputs an output signal indicating an amount of exposure to the signal processor, and
the signal processor
calculates an average value of an output signal from the optical sensor in the second exposure period and an output signal from the optical sensor in the third exposure period, and outputs a differential signal between the average value and an output signal from the optical sensor in the first exposure period.

17. The projection image pickup device according to claim 16, wherein
the frame includes a first exposure period to an Nth exposure period, where N is an integer greater than or equal to 4,
during a Kth exposure period in the frame, where K is an integer between 3 and N, both inclusive, the controller causes the pulsed-light emitter to emit light in synchronization with the operation reference timing and performs exposure control over the optical sensor in synchronization with a timing obtained by adding a predetermined delay time to the operation reference timing in a (K−1)th exposure period, and
the signal processor:
calculates an average value of output signals from the optical sensor except the first exposure period; and
outputs a differential signal between the average value and an output signal from the optical sensor in the first exposure period as a result.

\* \* \* \* \*